United States Patent
McKee Cooper

(10) Patent No.: US 7,949,139 B2
(45) Date of Patent: May 24, 2011

(54) TECHNIQUE FOR SUBWOOFER DISTANCE MEASUREMENT

(75) Inventor: Joel C. McKee Cooper, Lafayette, CO (US)

(73) Assignee: Cirrus Logic, Inc., Austin, TX (US)

(*) Notice: Subject to any disclaimer, the term of this patent is extended or adjusted under 35 U.S.C. 154(b) by 1499 days.

(21) Appl. No.: 11/002,102

(22) Filed: Dec. 3, 2004

(65) Prior Publication Data

US 2006/0062397 A1  Mar. 23, 2006

Related U.S. Application Data

(60) Provisional application No. 60/612,474, filed on Sep. 23, 2004.

(51) Int. Cl.
*H04R 29/00* (2006.01)

(52) U.S. Cl. .......................... 381/58; 702/97

(58) Field of Classification Search ............. 381/58, 381/59, 95, 96, 91, 122, 103, 56, 105; 702/149, 702/150, 85, 94, 97, 104, 176, 158; 73/597, 73/602, 584; 181/123, 124, 125; 342/77; 367/118, 99

See application file for complete search history.

(56) References Cited

U.S. PATENT DOCUMENTS

| | | | |
|---|---|---|---|
| 4,099,025 A * | 7/1978 | Kahn | 381/56 |
| 5,930,370 A | 7/1999 | Ruzicka | 381/18 |
| 6,253,293 B1 | 6/2001 | Rao et al. | 711/147 |
| 6,655,212 B2 | 12/2003 | Ohta | 73/586 |
| 6,721,428 B1 | 4/2004 | Allred et al. | 381/103 |
| 7,158,643 B2 * | 1/2007 | Lavoie et al. | 381/58 |
| 2004/0258259 A1 | 12/2004 | Koyama | 381/307 |

OTHER PUBLICATIONS

SHARC Melody Platform with Auto Room Tuner (ART) Technology, Analog Devices, www.analog.com/SHARC, © 2004, Analog Devices, Inc. One Technology Way, P.O. Box 9106, Norwood, MA 02062-9106.
Adaptive Signal Processing, Bernard Widrow, (c) 1985, Prentiss-Hall, INc., Englewood Cliffs, New Jersey, 17632. ISBN 0-13-004029 01.
"An Efficient Algorithm for Measuring the Impulse Response Useing Pseudorandom Noise", Jeffery Borish and James B. Angell, Stanford University, Center for Computer Research, J. Audio Eng. Soc. vol. 31, No. 7, Jul./Aug. 1983.
"Transfer-Function Measurement with Maximum-Length Sequences", Douglas D. Rife, DRA Laboratories, Sterling Virginia, J. Audio Eng. Soc., vol. 37, No. 6, Jun. 1989.
"Cirrus Logic's Intelligent room Calibration Software Optimizes Audio receiver System, Speaker Response for Ideal Sound Experience", http://www.cirrus.com/en/press/releases/P426.htrnl, Oct. 5, 2004.

* cited by examiner

*Primary Examiner* — Vivian Chin
*Assistant Examiner* — Con P Tran
(74) *Attorney, Agent, or Firm* — Robert Platt Bell; Steven Lin

(57) ABSTRACT

The present invention automatically corrects for subwoofer or other speaker crossover settings or other parameters by providing an adjustable factor passed upon not only pulse location, but on pulse width. In FIG. 2, as the low-pass frequency of the subwoofer is decreased, either by the crossover setting or the physical design of the subwoofer, the impulse response is shifted to the right and the width of the impulse increases. By relating the adjustment factor to the width of the impulse, the accuracy of the computed distance is greatly increased. The relation may be found doing a simple polynomial curve fitting to empirical data from several subwoofers at various crossover settings and distances, storing that data, and then measuring pulse location and width of the actual subwoofer during the setup routine, and adjusting the distance (delay) calculations accordingly.

19 Claims, 3 Drawing Sheets

US 7,949,139 B2

TECHNIQUE FOR SUBWOOFER DISTANCE MEASUREMENT

CROSS-REFERENCE TO RELATED APPLICATIONS

The present application claims priority from Provisional U.S. Patent Application No. 60/612,474 filed on Sep. 23, 2004, and incorporated herein by reference.

FIELD OF THE INVENTION

The present invention relates to a method and apparatus for calibrating a home theater system. In particular, the present invention is directed toward a technique for measuring the distance between a subwoofer or other speaker and a listener location.

BACKGROUND OF THE INVENTION

Home theater systems provide a number of components, which may be located in various parts of the room. The components include the home theater receiver/amplifier, front stereo speakers (left and right), rear surround sound speakers (left and right), a center speaker, and a subwoofer. Various other combinations of speakers may also be used, including additional or fewer speakers.

One problem with such systems is that a major aspect of acoustical sound reproduction may depend upon the relative location of each of the speakers in a room, relative to the preferred listening area, as well as room acoustics, speaker orientation, and the like. These aspects are largely outside the control of the manufacturer, as speaker placement can only be suggested by the manufacturer, and room configuration or other criteria may alter such placement by the consumer. In addition, the size of a room in which the system is setup is impossible to predetermine, and thus a great variance results in the placement, orientation, and location of speakers, as well as their relative distance from the preferred listening area.

One Prior Art approach for high-end home theater systems has been to hire a skilled acoustician to setup the home theater system. Such a skilled technician can adjust the location and placement of the speakers, and using various components (adjustable delays, equalizers, and even passive acoustical components) optimize the sound quality for a particular room. Unfortunately, hiring an acoustician to fine tune their home theater system is expensive while many "consumer grade" home theater systems sell for only a few hundred dollars, which is far less than the cost of even one in-home visit by an acoustician.

Another approach has been to provide a built-in system for measuring the relative time delay (e.g., location) of speakers within a room using a microphone and some processing equipment so that a consumer can calibrate the system for a given room. Such a system has many advantages, as it reduces the overall cost of installation, provides a better acoustical response to the system (resulting in fewer consumer complaints) and also allows the system to be easily moved to new locations.

While a number of such systems exist in the present market, one such system is illustrated, for example, by Ohta, U.S. Pat. No. 6,655,212, issued on Dec. 2, 2003 (hereafter "Ohta"), and incorporated herein by reference. FIG. 1 is a diagram from Ohta, illustrating a configuration of a measurement system including the sound field measuring apparatus. Measurement system 100 comprises a number of components. DSP (Digital Signal Processor) 1 outputs a test signal to D/A converters 2a, 2b, etc. Amplifiers 3a, 3b, etc. receive signals output from D/A converters 2a, 2b, etc. and drive speakers 4a, 4b, etc. Microphone 6 is disposed at a predetermined position (listening position) in an acoustic space 5 where the speakers 4a, 4b, etc. are placed. Amplifier 7 amplifies a signal output from microphone 6 and outputs the signal to A/D converter 8.

DSP 1 includes a number of components. Exponential pulse generator 11 generates an output signal to speaker ("SP") selector 12, which in turn outputs the signal to a selected one (or more) of D/A converters 2a, 2b, etc. RAM 14 stores a received signal from A/D converter 8. Calculation section 15 uses the data stored in RAM 14 to calculate the time of arrival of an exponential pulse transmitted via speaker 4a, 4b, etc. Control section 13 operates exponential pulse generator 11 and RAM 14 so as to synchronize start timings. Calculation section 15 includes a rising emphasizing section 151, a time detecting section 152, and a calculating section 153.

Although not shown, DSP 1 has a signal processing circuit, which, during multi-channel audio reproduction using the speakers 4a, 4b, etc., delays each channel's signal by a predetermined time period. According to this configuration, the perceived distances between the speakers and the listening position can be made constant by adjusting the time delays to compensate for the actual differences in distance.

In operation, a system such as that illustrated in FIG. 1 may send a signal generated by exponential pulse generator 11 (or other sound source) to a speaker 3a, 3b, etc. via speaker-selector 12. Microphone 6 may be positioned by a consumer at a preferred listening location in the room. Microphone 6 receives the exponential pulse (or other sound) from speaker 3a, 3b, etc. and transmits this signal, via amplifier 7 and A/D converter 8 to RAM 14. Calculating section 15 may then measure the time delay between the output of the sound pulse from speaker 4a, 4b, etc. and the reception at microphone 6, and thus calculate the relative distance of the speaker from the preferred listening position. This value may be displayed to the user as a physical distance, and/or may be used as a time delay value internally. Each speaker 4a, 4b, etc. is tested in turn and relative time delays calculated. The home theater system can then adjust the relative time delays of each speaker accordingly to provide optimal sound levels at the preferred listening area.

Thus, a home theater system may employ an "auto-setup" mode to determine speaker distance from a preferred listening location to set internal delays. The delay measurement may be measured by detecting the impulse response of the system through a variety of means (direct, Maximum Length Sequence (MLS), adaptive filter, and the like.). Such techniques for measuring the impulse response are known in the art. For example, Borish and Agell, "An Efficient Algorithm for Measuring the Impulse Response using Pseudorandom Noise", J. Audio Eng. Soc., Vol. 31, No. 7, July/August 1983, incorporated herein by reference, and Rife and Vanderkooy, "Transfer-Function Measurement with Maximum-Length Sequences", J. Audio Eng. Soc., Vol. 27, No. 6, June 1989, incorporated herein by reference, disclose how Maximum Length Sequences (MLS) can be used to measure the impulse response of a linear system.

In Prior Art audio and home theater systems, the location of the initial peak of the impulse response (delay) has been used to determine the distance of the speaker from a microphone placed at a preferred listening location. When measuring a subwoofer, however, the peak of the impulse response does not always accurately reflect the distance of the subwoofer from the preferred listening location due to the band-limited response of the speaker. Additionally, many subwoofers include a built-in low-pass crossover that further alters the impulse response and thus provides an inaccurate distance measurement.

FIG. 2 is a graph illustrating an example of the first peak of four impulse responses for different subwoofer settings. All four of the peaks were measured using the same test setup with a subwoofer 87 inches from a microphone in a typical room. The y-axis represents relative power levels as measured during testing. The x-axis represents the time delay of the initial peak, as measured in samples at a sample rate of 6 kHz.

The four lines, working from left to right, correspond to different subwoofer settings as follows. Line 110 represents the first peak response with the subwoofer crossover disabled. Line 120 represents the peak response with the subwoofer crossover set to 150 Hz. Line 130 represents the peak response with the subwoofer crossover set to 100 Hz. Line 140 represents the peak response with the subwoofer crossover set to 50 Hz.

In the graph of FIG. 2, peak 110, with the crossover disabled, most accurately reflects the location of the subwoofer from the microphone (e.g., approximately 87 inches). Succeeding peaks are located much further from the actual distance value. With the crossover set to 50 Hz, the peak of the impulse corresponds to a distance almost four feet from the actual location of the subwoofer. Inaccurate measurement of the subwoofer location hampers proper setup of the home theater system, as the subwoofer sound may not be optimized for the preferred listening location.

Prior Solutions to this problem have been varied. In some applications, manufacturers simply ignore the problem, as they have no ready fix. This approach is obviously not an adequate solution. Other manufacturers instruct the consumer to disable the subwoofer crossover network, or set it to its highest frequency setting. Unfortunately, many subwoofers do not allow the crossover to be disabled and/or do not have an adjustable frequency setting. In addition, even if the subwoofer were so equipped, a consumer would have to know how to perform such a procedure and take the extra step when calibrating the system and remember to reset the subwoofer when completed.

Another solution is to insert a so-called "fixed fudge-factor." When measuring a subwoofer, a fixed value is subtracted from the result to approximate the correct location of the subwoofer. In the example illustrated in FIG. 2, adding such a "fixed fudge factor" could change the error from +4 feet to +/−2 feet, depending upon subwoofer crossover settings. Obviously, this approach is also very limited.

Thus, it remains a requirement in the art to provide a technique for measuring distance (delay) for a subwoofer or other speaker whereby the crossover settings of the speaker do not need to be changed or known in order to accurately measure the location of the speaker.

SUMMARY OF THE INVENTION

The present invention automatically corrects for subwoofer or other speaker crossover settings or other parameters by providing an adjustable factor based upon not only pulse location, but on pulse width. In FIG. 2, as the low-pass frequency of the subwoofer is decreased, either by the crossover setting or the physical design of the subwoofer, the impulse response is shifted to the right and the width of the impulse increases. By relating the adjustment factor to the width of the impulse, the accuracy of the computed distance is greatly increased. The relation may be found doing a simple polynomial curve fitting to empirical data from several subwoofers at various crossover settings and distances, storing that data, and then measuring pulse location and width of the actual subwoofer during the setup routine, and adjusting the distance (delay) calculations accordingly.

DETAILED DESCRIPTION OF THE INVENTION

Figure 3:
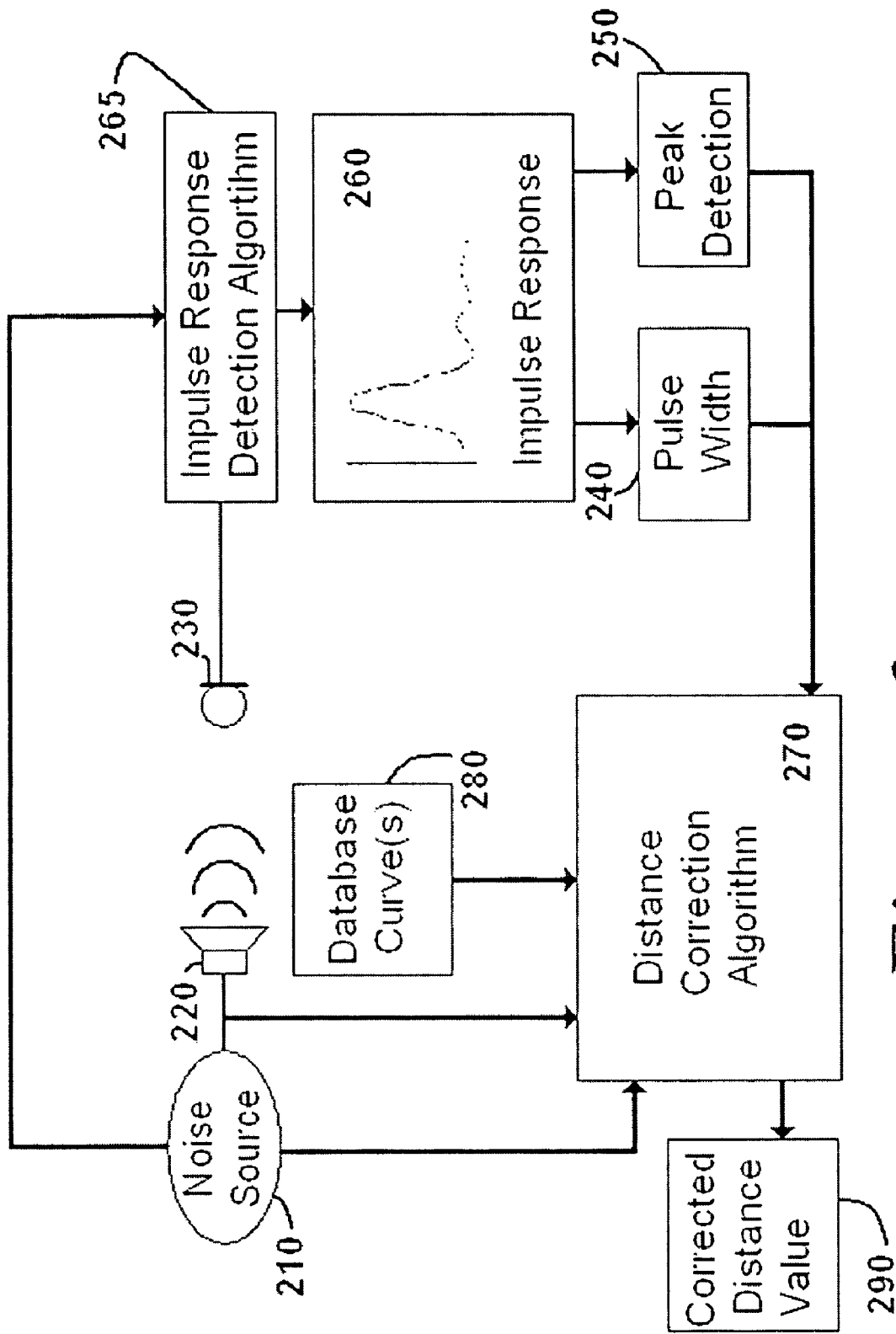
FIG. 3 is a block diagram of the apparatus of the present invention.

FIG. 3 is a block diagram of the apparatus of the present invention. For the sake of simplicity, many of the basic components in an auto-setup home theater system are not illustrated here for the sake of clarity. Referring to FIG. 3, a noise source 210 may be used to generate a sound pattern or series of impulses or the like through speaker 220. The actual sound used may encompass any of the known sound patterns known in the art for measuring speaker location and the like. Speaker 220 represents the system subwoofer or other speaker, which may be measured for the present test and calibration cycle.

Microphone 230 may be located by the consumer at a preferred listening location (e.g., near the head of the consumer at a favorite chair or the like). Microphone 230 picks up noise or other sound from speaker 220, which will be delayed by an amount of time equal to the speed of sound divided by the distance between microphone 230 and speaker 220. Other internal delays may, of course, exist within the electronics of the system, but such delays are minor and uniform and can be easily compensated for and are not affected by speaker location.

Figure 1:
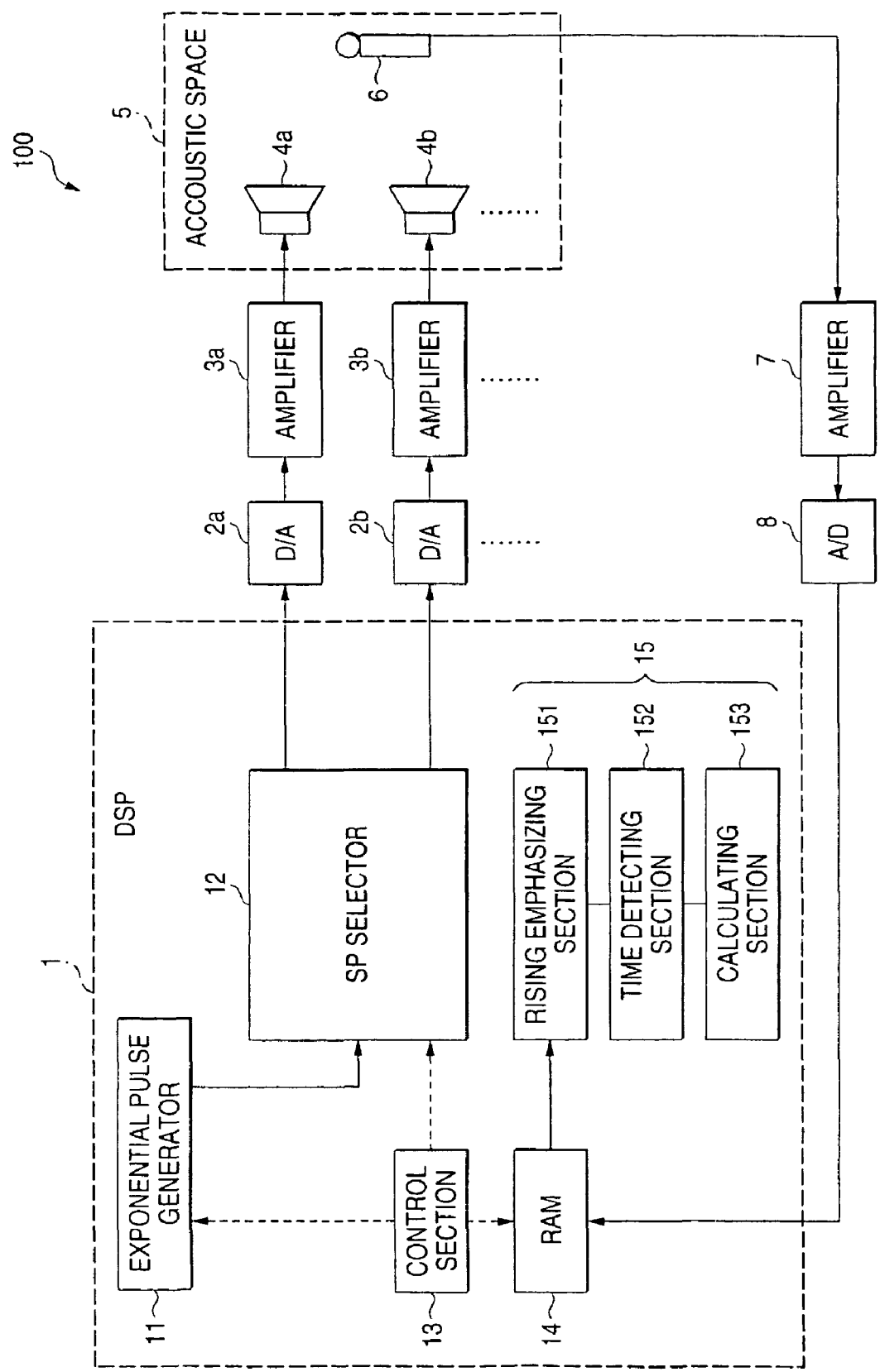
FIG. 1 is a Prior Art diagram illustrating a configuration of a measurement system including a sound field measuring apparatus.
Figure 2:
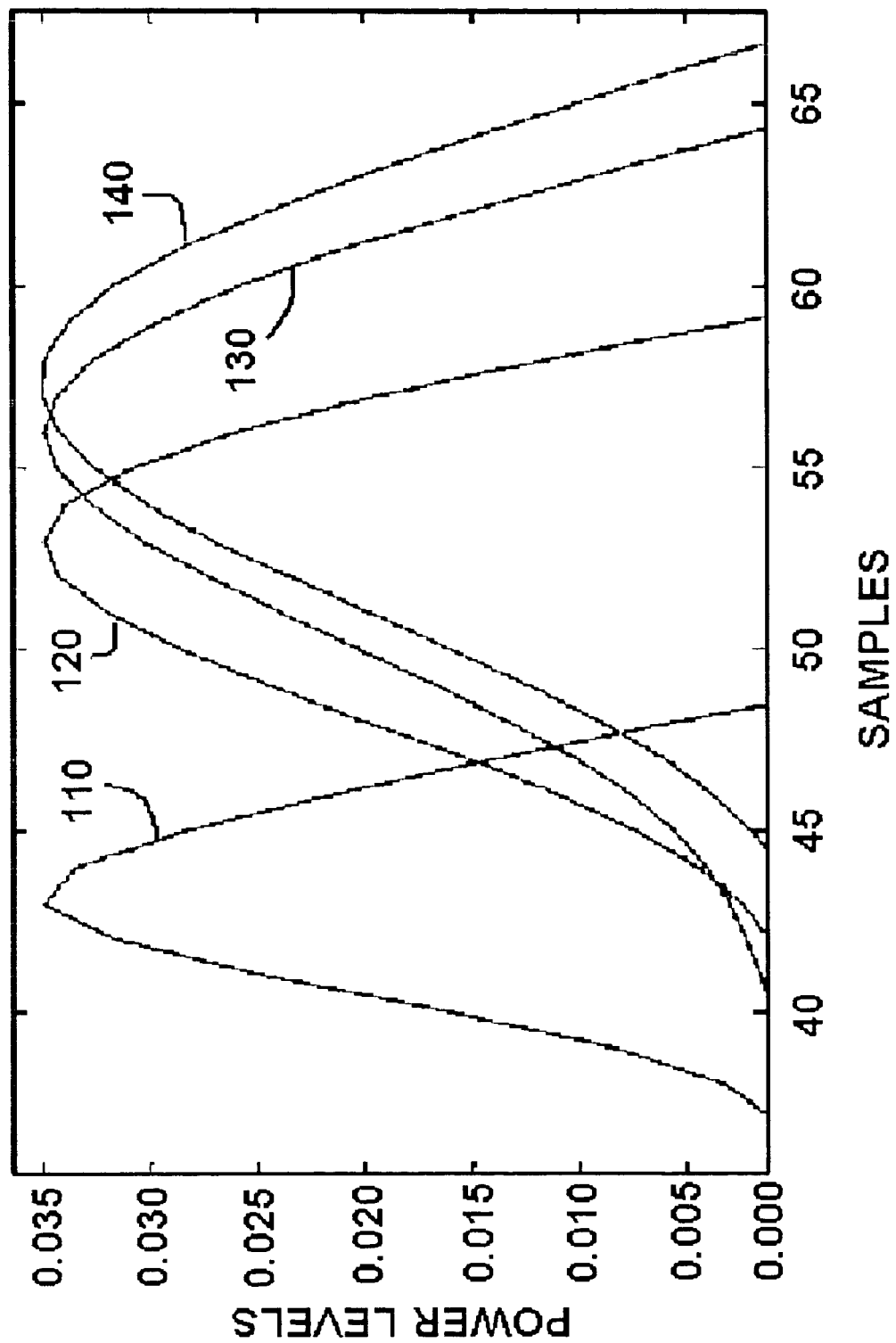
FIG. 2 is a graph illustrating an example of the first peak of four impulse responses for different subwoofer settings.

The output of microphone 230 may then pass to impulse response and detection algorithm 265. For the sake of illustration, associated microphone and speaker amplifiers for microphone 230 and speaker 220 are not shown in FIG. 3. Impulse response detection algorithm 256 produces an impulse response 260 similar to one of the pulses illustrated in FIG. 2. The location and width of the pulse will be dependent upon the location of the speaker from the microphone, and the crossover settings or characteristics of the speaker. Impulse response and detection algorithm 265 may optionally be connected to noise source 210 to aid in measuring the impulse response 260.

From impulse response 260, pulse width 240 and peak detection 250 may be derived. Pulse width 240 may comprise the pulse width measured at a particular height of the pulse, in order to properly filter out noise. Pulse width 240 may be given as a number of samples or as a time value. Peak detection 250 may provide a time value for the location of the peak value of the first pulse of the impulse response. Again, this value may be provided as a number of samples or as a time value, as measured from the time when the noise source first generated the sound over speaker 220, or some other constant measurable point in time.

Distance correction algorithm 270 then calculates a connected distance value 290 from pulse width 240 and peak detection 250 values. As in the prior art, a "raw" distance value call be easily calculated from the peak detection. However, as illustrated in the Background of the Invention, this "raw" distance value may be inaccurate, depending upon the subwoofer crossover settings, or indeed the inherent characteristics of the subwoofer or other speaker. The pulse width value, however, may be used to accurately correct this "raw" distance value. From database curves 280, a database factor may be retrieved to correct the distance value as follows:

(Corrected Distance)=(Raw Distance)−(Database Factor)*(Pulse Width)

Alternately, a more complicated polynomial relation may be used, depending upon the measured relationship between pulse width, peak location, subwoofer characteristics, and actual measured distance, as determined empirically by testing procedures. To establish such a relationship, various popular subwoofer or other speaker types may be tested in a laboratory setting, located at fixed distances from a test microphone, and impulse response data measured. The pulse width, peak location (delay), and other data may then be collected for various speaker types and speaker settings, at various distances from the microphone. From this data, a mathematical relationship between the actual distance, pulse width, and peak location can be mapped.

If the relationship is such that it cannot be readily converted into a polynomial equation, a look up table (LUT) may be used to correspond pulse width and peak location to a corrected distance factor. Such a look up table may also be used to provide different data fields for different speakers brands, types, or other criteria, which may be selected by a user through a user input. Alternately, a number of speaker characteristic polynomials or data fields may be provided stored in database curve 280. The speaker may then be provided with a data code or number that corresponds to a particular data curve best matching the speaker's response. The consumer may then enter such a code, and the closest matching polynomial or data field selected for optimal speaker distance measuring selected.

Database curves 280 may be generated by testing a number of typical consumer grade subwoofers for popular home theater systems, or may be tailored for particular systems (often sold as package). In addition, it may be possible to allow a consumer to select a subwoofer type, brand, or model to allow the system to select the best factor from database curve(s) 280. The Database Factor given in the equation above may vary depending upon pulse width, in a non-linear manner, such that the necessary correction may not be merely a simple constant. In a simplified embodiment, however, a constant value may be used to reduce complexity of the invention.

While the present invention is disclosed in connection with measuring subwoofer distance accurately, the technique of the present invention may also be applied for other speakers as well, without departing from the spirit and scope of the present invention. In particular, database curve(s) 280 may be provided for each speaker type (main left and right, surround left and right, center, subwoofer, or other) and appropriate calibration obtained. Thus, the present invention may be used to increase the accuracy in distance (delay) measurement of all speakers within a system, in addition to the subwoofer, or one or more of the speakers as desired.

While the preferred embodiment and various alternative embodiments of the invention have been disclosed and described in detail herein, it may be apparent to those skilled in the art that various changes in form and detail may be made therein without departing from the spirit and scope thereof.

I claim:

1. A method for measuring distance between an audio loudspeaker and a selected location, comprising:
    placing a microphone at the selected location,
    outputting an audio test signal from the audio loudspeaker,
    receiving the audio test signal at the microphone,
    measuring an impulse response to the audio test signal from the audio loudspeaker at the microphone to detect both a time delay of an initial pulse of the impulse response and width of the initial pulse of the impulse response at a predetermined level,
    calculating an initial raw distance value from the audio loudspeaker to the selected location as a function of the time delay of the initial pulse by retrieving, from a database, data correlating predetermined audio loudspeaker type characteristics and the time delay of the initial pulse to distance between the audio loudspeaker and the microphone, and
    applying the audio loudspeaker type characteristics, the time delay of the initial pulse, and width of the initial pulse to the data in the data base to output a correction factor for correcting distance calculation between the audio loudspeaker and the selected location and calculating a corrected distance value from the audio loudspeaker to the selected location by subtracting from the initial raw distance value, the pulse width of the initial pulse multiplied by the correction factor.

2. The method of claim 1, wherein outputting an audio signal comprises generating a predetermined audio signal pattern including a pseudorandom noise from the audio loudspeaker.

3. The method of claim 1, wherein outputting an audio signal comprises generating a predetermined audio signal pattern including a maximum length sequence from the audio loudspeaker.

4. A method for measuring distance between an audio loudspeaker and a microphone at a selected location, the audio loudspeaker and microphone being coupled together with a system, the method comprising:
    measuring an impulse response of the system to produce an impulse response signal having an initial pulse by outputting an audio signal from the audio loudspeaker, and measuring the response to the audio signal at the microphone, and
    calculating the distance from the audio loudspeaker to the microphone from a time delay of the initial pulse and the width of the initial pulse by:
        retrieving, from a database, data correlating predetermined audio loudspeaker type characteristics, the time delay of the initial pulse, and the width of the initial pulse to distance between the audio loudspeaker to the microphone, and
        applying the audio loudspeaker type characteristics, the time delay of the initial pulse, and width of the initial pulse to the data in the data base to output a correction factor for correcting distance calculation between the audio loudspeaker and the selected location
    wherein the data correlating predetermined audio loudspeaker type characteristics, the time delay of the initial pulse, and the width of the initial pulse to distance between the audio loudspeaker, and the correction factor are determined by a measured relationship between pulse width, peak location, subwoofer characteristics, and actual measured distance,
    wherein the measured relationship is predetermined empirically by testing procedures in a laboratory setting, comprising
    locating various speaker types at various distances from a test microphone
    generating a test signal from the various speakers types,
    measuring impulse response at the microphone, collecting pulse width, pulse location, for the various speaker types at the various distances from the microphone, and calculating a mathematical relationship between the various distances, pulse width, and peak location to create the predetermined relation.

5. The method of claim 4, wherein the predetermined relation comprises a polynomial equation relating the time delay of the initial pulse and the width of the initial pulse to the distance from the audio loudspeaker to the microphone.

6. The method of claim 4, wherein the predetermined relation comprises a lookup table correlating the time delay of the initial pulse and the width of the initial pulse to the distance from the audio loudspeaker to the microphone.

7. The method of claim 4, wherein outputting an audio signal comprises generating a predetermined audio signal pattern including a pseudorandom noise from the audio loudspeaker.

8. The method of claim 4, wherein outputting an audio signal comprises generating a predetermined audio signal pattern including a maximum length sequence from the audio loudspeaker.

9. An apparatus for measuring distance between an audio loudspeaker and a selected location, the apparatus comprising:
an audio input for receiving an audio signal from a microphone placed at the selected location,
an audio output for providing an audio signal from the audio loudspeaker,
an impulse response measurement system for measuring an impulse response to the audio signal at the microphone, to detect a time delay of an initial pulse of the impulse response and a pulse width of the initial pulse of the impulse response, and
a processor for calculating an initial raw distance value from the audio loudspeaker to the selected location as a function of the time delay of the initial pulse, the processor including a database for storing data correlating predetermined audio loudspeaker type characteristics and the time delay of the initial pulse to distance between the audio loudspeaker and the microphone,
wherein the processor applies the time delay of the initial pulse and width of the initial pulse to the data in the data base to output a correction factor for correcting distance calculation between the audio loudspeaker and the selected location and calculates a corrected distance value from the audio loudspeaker to the selected location by subtracting from the initial raw distance value, the width of the initial pulse multiplied by the correction factor.

10. The apparatus of claim 9, wherein the audio output generates a predetermined audio signal pattern including a pseudorandom noise from the audio loudspeaker.

11. The apparatus of claim 9, wherein the audio output generates a predetermined audio signal pattern including a maximum length sequence from the audio loudspeaker.

12. A system for measuring distance between an audio loudspeaker and a microphone at a selected location, the audio loudspeaker and microphone being coupled together with the system, the system comprising:
an impulse response measurement sub-system for measuring an impulse response of a system to produce a response signal having an initial pulse by outputting an audio signal from the audio loudspeaker, and measuring the response to the audio signal at the microphone, and a processor for calculating the distance from the audio loudspeaker to the microphone from a time delay of the initial pulse and the width of the initial pulse, the processor including:
a database for storing data correlating predetermined audio loudspeaker type characteristics, the time delay of the initial pulse, and the width of the initial pulse to distance between the audio loudspeaker to the microphone,
wherein the processor applies the time delay of the initial pulse and the width of the initial pulse to the data in the database, to output a correction factor for correcting distance calculation between the audio loudspeaker and the selected location using a predetermined relation depending upon the measured relationship between pulse width, peak location, subwoofer characteristics, and actual measured distance,
wherein the predetermined relation is predetermined empirically by testing procedures in a laboratory setting, comprising:
locating various speaker types at various distances from a test microphone,
generating a test signal from the various speakers types,
measuring impulse response at the microphone,
collecting pulse width and pulse location, for the various speaker types at the various distances from the microphone, and
calculating a mathematical relationship between the various distances, pulse width, and peak location to create the predetermined relation.

13. The system of claim 12, wherein the predetermined relation comprises an equation relating the time delay of the initial pulse and the width of the initial pulse to the distance from the audio loudspeaker to the microphone.

14. The system of claim 12, wherein the predetermined relation comprises a lookup table correlating the time delay of the initial pulse and the width of the initial pulse to the distance from the audio loudspeaker to the microphone.

15. The system of claim 12, wherein the audio output generates a predetermined audio signal pattern including a pseudorandom noise from the audio loudspeaker.

16. The system claim 12, wherein the audio output generates a predetermined audio signal pattern including a maximum length sequence from the audio loudspeaker.

17. A home theater system provided with an auto-setup mode for measuring distance between an audio loudspeaker and a selected listening location and delaying audio signals to the audio loudspeaker proportionally to the distance between the audio loudspeaker and the selected location, the home theater system, comprising:
an audio output for generating an audio test signal to the at least one audio loudspeaker,
at least one audio loudspeaker for receiving the audio test signal and generating an acoustical audio signal,
a microphone, for receiving the acoustical audio signal when the microphone is placed at the selected listening location and outputting a received audio test signal,
an impulse response measurement system for measuring an impulse response to the received audio test signal at the microphone, to detect a time delay of an initial pulse of the impulse response and a width of the initial pulse of the impulse response, and
a processor for calculating an initial raw distance value from the audio loudspeaker to the selected location as a function of the time delay of the initial pulse of the impulse response and adjusting a time delay for audio signals generated by the at least one audio loudspeaker, the processor including a database for storing data correlating predetermined audio loudspeaker type characteristics and the time delay of the initial pulse of the impulse response to distance between the audio loudspeaker and the microphone, wherein the processor applies the time delay of the initial pulse of the impulse response and width of the initial pulse of the impulse response to the data in the data base to output a correction factor for correcting distance calculation between the audio loudspeaker and the selected location and calculates a corrected distance value from the audio loudspeaker to the selected location by subtracting from the initial raw distance value, the width of the initial pulse of the impulse response multiplied by the correction factor.

18. The home theater system of claim 17, wherein the audio output generates a predetermined audio signal pattern including a pseudorandom noise from the audio loudspeaker.

19. The home theater system of claim 17, wherein the audio output generates a predetermined audio signal pattern including a maximum length sequence from the audio loudspeaker.

\* \* \* \* \*